United States Patent
Hsu et al.

(10) Patent No.: US 7,206,208 B1
(45) Date of Patent: Apr. 17, 2007

(54) SYNCHRONOUS RECTIFYING CONTROL CIRCUIT

(75) Inventors: Da-Jing Hsu, Sijhih (TW); Yun-Kang Zhu, Sijhih (TW); Chwun-Min Lin, Sijhih (TW)

(73) Assignee: Niko Semiconductor Co., Ltd., Taipai (TW)

( * ) Notice: Subject to any disclaimer, the term of this patent is extended or adjusted under 35 U.S.C. 154(b) by 0 days.

(21) Appl. No.: 11/331,274

(22) Filed: Jan. 13, 2006

(51) Int. Cl.
  H02M 3/335 (2006.01)
  H02M 3/22 (2006.01)
(52) U.S. Cl. .............. 363/21.06; 363/81; 363/127
(58) Field of Classification Search .......... 363/16, 363/21.06, 21.14, 53, 76, 81, 84, 89, 125, 363/127
See application file for complete search history.

(56) References Cited

U.S. PATENT DOCUMENTS

| | | | |
|---|---|---|---|
| 6,870,747 B2 * | 3/2005 | Bridge | 363/21.06 |
| 6,995,991 B1 * | 2/2006 | Yang et al. | 363/21.14 |
| 7,050,310 B2 * | 5/2006 | Yang | 363/21.06 |

* cited by examiner

Primary Examiner—Gary L Laxton
(74) Attorney, Agent, or Firm—Dykema Gossett PLLC

(57) ABSTRACT

A synchronous rectifying control circuit for utilizing in a forward topology of rectifying circuit. The circuit controls a first current switch and a second current switch provided on both ends of a secondary of a transformer. Two sets of the same of control circuits are utilized to control and adjust respectively the post and future periods of the conductive time and the driving synchronous rectifying switches are extended to replace the conventional of rectifier diodes rectifying method. An improved synchronous rectifying control circuit comprises pulse interruptive protection circuit to prevent the cross-conduction between two current switches and an anti reversing protection circuit to prevent a reverse current from flowing back to the ground.

14 Claims, 4 Drawing Sheets

SYNCHRONOUS RECTIFYING CONTROL CIRCUIT

FIELD OF INVENTION

The present invention relates generally to a synchronous rectifying control circuit. More particularly, the present invention relates to a synchronous rectifying control circuit suitable for utilizing in a forward topology of a rectifying circuit, and the synchronous rectifying control circuit can control a first current switch and a second current switch provided on both ends of a second winding of a transformer.

DESCRIPTION OF THE RELATED ART

FIG. 1 shows a schematic view of a conventional forward circuit. The conventional forward circuit comprises a transformer T1, wherein a power terminal B+ of the direct current source is installed in the connecting primary circuit. The forward circuit further comprises a pulse width modulation controller PWMC, an input filter capacitor C2, a current sense resistor R1, a start-up resistor R2 and a rectifier diode D3. The pulse width modulation controller PWMC controls the current switch Q1, and the secondary of the transformer T1 installs two output rectifier diodes D1 and D2. An energy storage inductor L0 and output filter capacitor C1 are present in the forward circuit. The PWMC controls the functions of the forward circuit, wherein a forward rectifying period and a fly wheeling period are produced within one completed period. During the fly wheeling period, an output energy is supplied by an energy storage inductor L0. In the whole output process, either in the forward rectifying period or the fly wheeling period, the current must pass through the rectifier diodes D1 or D2, the dropout voltage of the rectifier diodes D1 and D2 are between a range of 0.4–1.0 volts, so a huge amount of dropout voltage is lost through the output process, an amount of energy is wasted.

SUMMARY OF THE INVENTION

It is an object of the present invention to provide a synchronous rectifying control circuit, suitable for utilizing in a forward topology of rectifying circuit, and the circuit controls a first current switch and a second current switch provided on the secondary of a transformer. The synchronous rectifying control circuit comprises a forward synchronous rectifying driven unit to receive a synchronous control voltage signal from a drain pin of the second current switch of the fly-wheeling rectifying, and a first gate switch signal of the forward synchronous rectifying is produced in order to control on and off of the first current switch. A signal-producing unit is acting as a frequency divider, wherein an original value of the first gate switch signal is divided into half, so that a first charge switch signal is produced and its inversed signal is regarded as a second charge switch signal of the half frequency. A first charge & discharge control circuit and a second charge & discharge control circuit produce a charging current of the first charge switch and the second charge switch signals respectively during a charge period in order to provide charging respectively to a first capacitor and a second capacitor steadily. The first discharge switch and the second discharge switch signals are utilized to control a discharge current for discharging the first capacitor and the second capacitor steadily during a discharge period, wherein potential of the first capacitor and the second capacitor are compared respectively with a reference potential in order to produce respectively a first and a second discharge switch signals. In a fly wheeling synchronous rectifying driven unit, the first discharge switch signal and the second discharge signal are inputted in order to produce a pause period signal, wherein the pause period starts when potential of the first and second capacitor are equaled to the first potential reference during a discharge process. The pause period ends when a next charge period of the first and second charge switch signals start, the fly wheeling synchronous rectifying driven unit inputs a first gate switch signal and the pause period signal so that a second gate switch signal of the fly wheeling synchronous rectifying driven unit is produced. The second gate switch signal is utilized to control the second current switch so that the second current switch will only be switched on during a non-pause period and when the first current switch is on an off status. A power supply unit is providing the source voltage for outputting the first reference potential value and a second reference potential value. The circuit of the present invention further comprises a pulse interruptive protection circuit and an anti reversing protection circuit.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
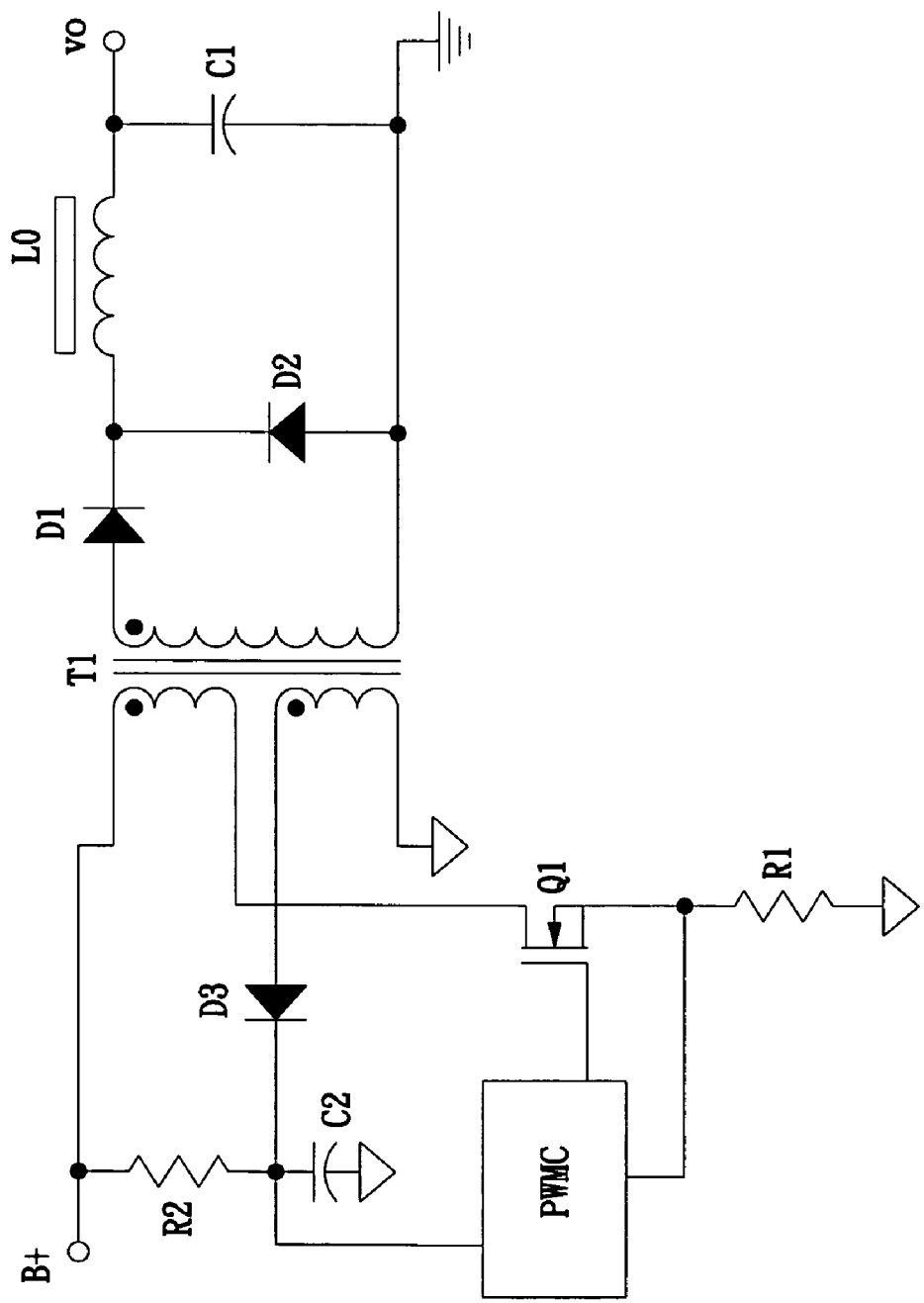
FIG. 1 shows a schematic view of a conventional forward circuit
Figure 2:
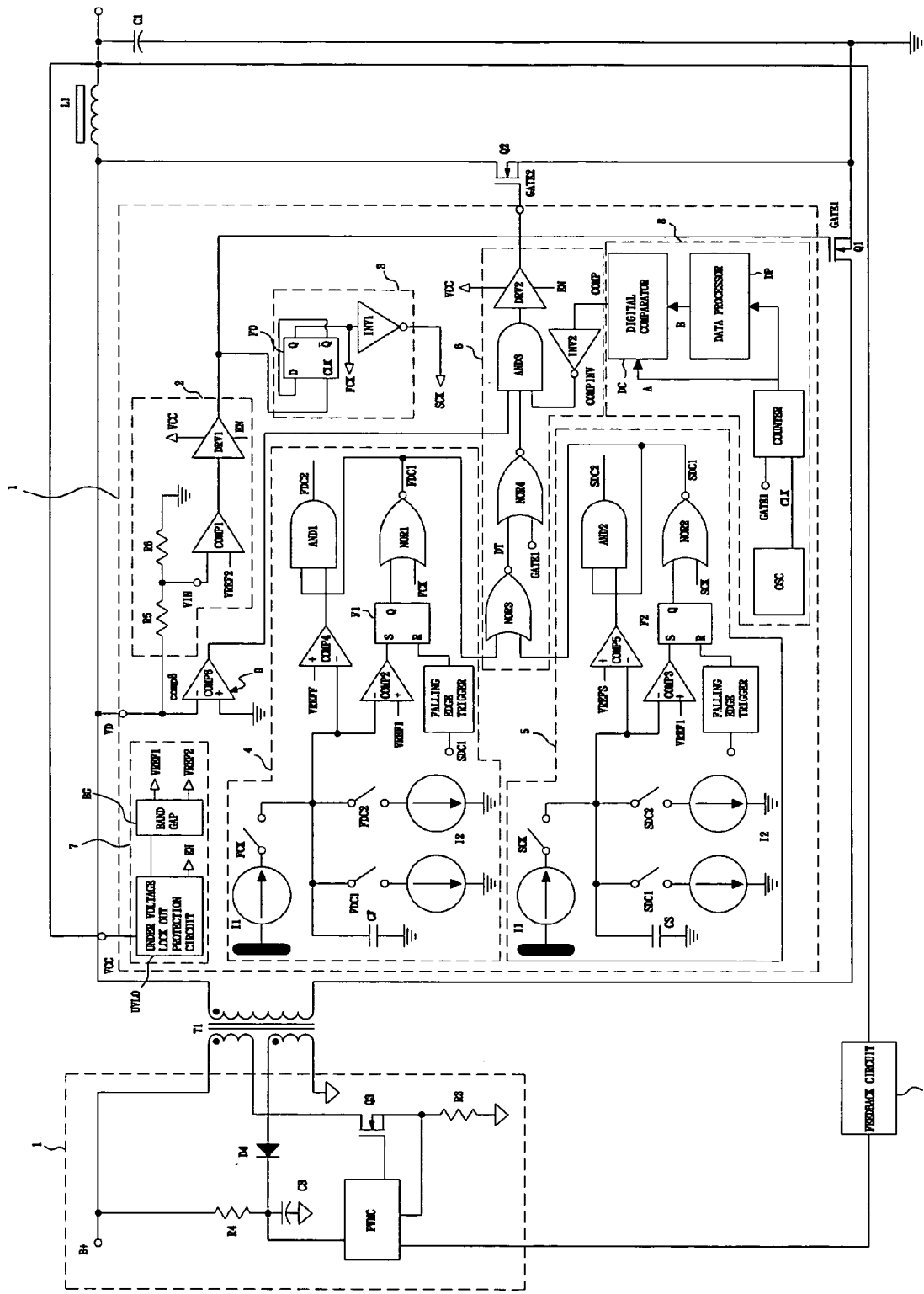
FIG. 2 illustrates a schematic view of a synchronous rectifying control circuit in accordance with a preferred example of the present invention

FIG. 2 illustrates a view of a synchronous rectifying control circuit in accordance with a preferred example of the present invention. FIG. 2 shows that a type of synchronous rectifying control circuit 1 that is utilized for a secondary of a transformer T1 and a primary circuit 1 in a forward control circuit. The synchronous rectifying control circuit of the present invention comprises an electrical power terminal B+ of a direct current power supply connected to the primary circuit, a pulse width modulation controller (PWMC), an input filter capacitor C3, a current sense resistor R3, a start-up resistor R4, a rectifier diode D4 and a current switch Q3. The secondary of the transformer T1 further comprises an output filter capacitor C1 and an energy storage inductor L1, and a first current switch Q1 and a second current switch Q2 installed at the secondary of the transformer T1.

The synchronous rectifying control circuit 1 controls the first current switch Q1 and the second current switch Q2, wherein a feedback circuit FB connects to the output of the power circuit for producing a feedback signal to the PWMC of the primary circuit. The synchronous rectifying control circuit 1 further comprises a forward synchronous rectifying driven unit 2 gaining a synchronous control voltage signal VD from the drain pin of the second current switch of the fly-wheeling synchronous rectifying to produce a first gate switch signal GATE 1 of a forward synchronous rectifying in order to control a function of switching on or off of the first current switch Q1. A signal-producing unit acted as a frequency divider 3 will divide the frequency of the first gate switch signal GATE 1 into half so that a half value of the original frequency of the first gate switch signal GATE 1 (50%) is produced and a second current switch signal SCK which is opposite to a first current charge switch signal FCK is also produced.

A first charge & discharge control circuit 4 and a second charge & discharge control circuit 5 provide steadily current I1 to a first capacitor CF and a second capacitor CS respectively during a charged period of the first charge switch signal FCK and the second charge switch signal SCK. During a current discharged period of a first discharge switch signal and a second discharge switch signal, the first charge & discharge control circuit 4 and a second charge & discharge control circuit 5 release current I2 steadily from the first capacitor CF and the second capacitor CS, and compare potentials of the first capacitor CF and the second capacitor CS with a first reference voltage VREF1 in order to output a first discharge switch signal FDC1 and a second discharge switch signal SDC1.

A fly wheeling synchronous rectifying driven unit 6 inputs the first discharge switch signal FDC1, the second discharge switch signal SDC1 and the first gate switch signal GATE1 in order to produce a second gate switch signal GATE2 of the fly wheeling synchronous rectifying. So that the second current switch Q2 is controlled to switch off right after the on-time of the first current switch Q1 by utilizing a pause signal DT to prevent the cross-conduction from occurring between the first current switch Q1 and the second current switch Q2. A current power supply unit 7 provides source voltage VCC to output the first reference voltage VREF1 and a second reference voltage VREF2. A pulse interruptive protection circuit 8 utilizes an oscillator OSC to produce clock signal CLK passing through a counter in order to determine every period of the first gate switch signal GATE 1 of the forward synchronous rectifying. When the pulse interruptive protection circuit 8 discovers the time of present period is greater than previous period, the fly wheeling synchronous rectifying driven unit 6 is disabled the on-time of the second current switch Q2 forcibly on the following period, and together with an anti-reversing current protection circuit 9, the power circuit can work excellent in a very light load condition. Therefore, the current switches Q1 and Q2 will not have the problem of the cross-conduction and current reversing.

The above-mentioned of the synchronous rectifying control circuit in accordance with a preferred example of the present invention. The forward synchronous rectifying driven unit 2 utilizes voltage divider resistors R5 & R6 to receive an input signal VIN passing through a first comparator COMP1 by comparing the input signal VIN with the second reference voltage VREF2 so that a first driver DRV1 is decided to produce the first gate switch signal GATE 1.

The above-mentioned of the synchronous rectifying control circuit 1 in accordance with a preferred example of the present invention. The signal-producing unit acting as a frequency divider 3 further comprises a flip-flop F0 of the input first gate switch signal GATE 1. The flip-flop F0 outputs the first charge switch signal FCK through the first inverter INV1 to output the second charge switch signal SCK.

The first charge & discharge control circuit 4 and the second charge & discharge control circuit 5 of the synchronous rectifying control circuit 1 are compared the voltage of the first reference voltage VREF1 with the potentials of the first capacitor CF and the second capacitor CS by utilizing respectively a second comparator COMP2 and a third comparator COMP3. The comparing result is inputted with a contacting signal of the second charge switch signal and the first charge switch signal into a first flip-flop F1 and a second flip-flop F2. The output signals of the first flip-flop F1 and the second flip-flop F2 are inputted with the first charge switch signal FCK and the second charge switch signal SCK into a first NOR gate NOR1 and a second NOR gate NOR2. Thus, the first and second gates NOR1/NOR2 output a first discharge switch signal FDC1 and a second discharge switch signal SDC1.

The fly wheeling synchronous rectifying driven unit 6 inputs the first discharge switch signal FDC1 and the second discharge switch signal SDC 1 into a third NOR gate NOR3. The output signal of the third NOR gate NOR3 and the first gate switch signal GATE1 are inputted to a fourth NOR gate NOR4. Through a second driver DRV2, the second gate switch signal GATE2 is provided, or a third AND gate AND3 is formed in between a fourth NOR gate NOR4 and the second driver DRV2 in order to organize all the signals controlling the second current switch Q2 and output the second gate switch signal GATE2 through the third AND gate AND3.

A power supply unit 7 is located in between an under voltage lock-out protection circuit UVLO and a band gap BG in order to allow the under voltage lock-out protection circuit UVLO outputting the voltage power and an enabling signal EN. The enable signal EN is outputted to the first driver DRV1 and the second driver DRV2 so that, when the voltage of the source voltage VCC is below 7 volts, the first current switch Q1 and the second current switch Q2 are switched off forcibly. The band gap BG outputs the first reference voltage VREF1 and a second reference voltage VREF2.

Within the first charge & discharge control circuit 4 and the second charge & discharge control circuit 5 of the synchronous rectifying control circuit 1, a discharge current I2 can further comprises at least one auxiliary discharge current. The auxiliary discharge current is utilized to increase a discharging current process so that the modulation period of the voltage of the first capacitor CF and the second capacitor CS is increased. The accuracy of controlling the pause period is improved. The first charge & discharge control circuit 4 and the second charge & discharge control circuit 5, a fourth comparator COMP4 and a fifth comparator COMP5 are utilized respectively to compare a auxiliary reference voltage VREFF and a second auxiliary reference voltage VREFS to the voltage of the first capacitor CF and the second capacitor CS.

However, the voltage of the first auxiliary reference voltage VREFF and the second auxiliary reference voltage VREFS are not constant values, VREFF=VREF1+0.25*(VCFP−VREF1), and VREFS=VREF1+0.25*(VCSP−VREF1). The VCFP and VCSP are the maximum voltage in respect to the first capacitor CF and the second capacitor SC. The voltage of the first capacitor CF and the second capacitor SC are compared to the first auxiliary reference voltage VREFF and the second auxiliary reference voltage VREFS. The comparison result is inputted with the first discharge switch signal FDC1 and the second discharge switch signal SDC2 into the first AND gate AND1 and the second AND gate AND2. A first auxiliary discharge switch signal FDC2 and a second auxiliary discharge switch signal SDC2 are calculated and outputted to control the switch on/off of the auxiliary discharged current in the circuit.

The present invention provides an improved design, steady current values of the charge current I1, the discharge current I2 and the auxiliary discharge current can be fixed internally or determined respectively in accordance with an outer resistance.

The synchronous rectifying control circuit 1 in according to a preferred example of the present invention further comprises a pulse interruptive protection circuit 8 to calculate the numbers of pulse time in order to determine the every periodic timing of the first gate switch signal. A conceal signal is outputted to switch the second current switch Q2 off forcibly in a pulse interruptive period of a following period. The pulse interruptive protection circuit 8 utilizes the oscillator OSC to produce the timing pulses. In according to the clock signal CLK and the first gate switch GATE1, the counter is utilized to calculate in order to produce a first count data A for every period. A periodic data processor DP produces a second count data B. When the first count data A of the present period is greater than the values of the previous period, the calculated value of the second count data B from the following period will be forcibly equaled to the value of the first count data A of the present period. Otherwise, the counting value of the second count data B will be 1.5 greater than the counting value of the first count data A. A digital comparator DC is utilized to compare the count values of the first count data A and the second count data B. When the count value of the first count data A is greater than the second count data B in every period, the digital comparator DC will output the conceal signal to forcibly switch the second current switch Q2 off in following period, wherein the conceal signal will pass through the second inverter device INV2 of the fly wheeling synchronous rectifying driven unit 6 to input the third AND gate AND3.

A synchronous rectifying control circuit in accordance with a preferred example of the present invention. In a preferred improved design, the circuit further comprises an anti reversing protection circuit 9, wherein a comparator COMP6 is utilized to compare the synchronous rectifying voltage signal VD and a grounded zero voltage. An anti reversing signal is outputted and transmitted to the third AND gate AND3 of the fly-wheeling synchronous rectifying driven unit 6. So that when a synchronous control voltage signal VD is higher than zero voltage, the second current switch Q2 is forcibly to switch off.

Figure 3:
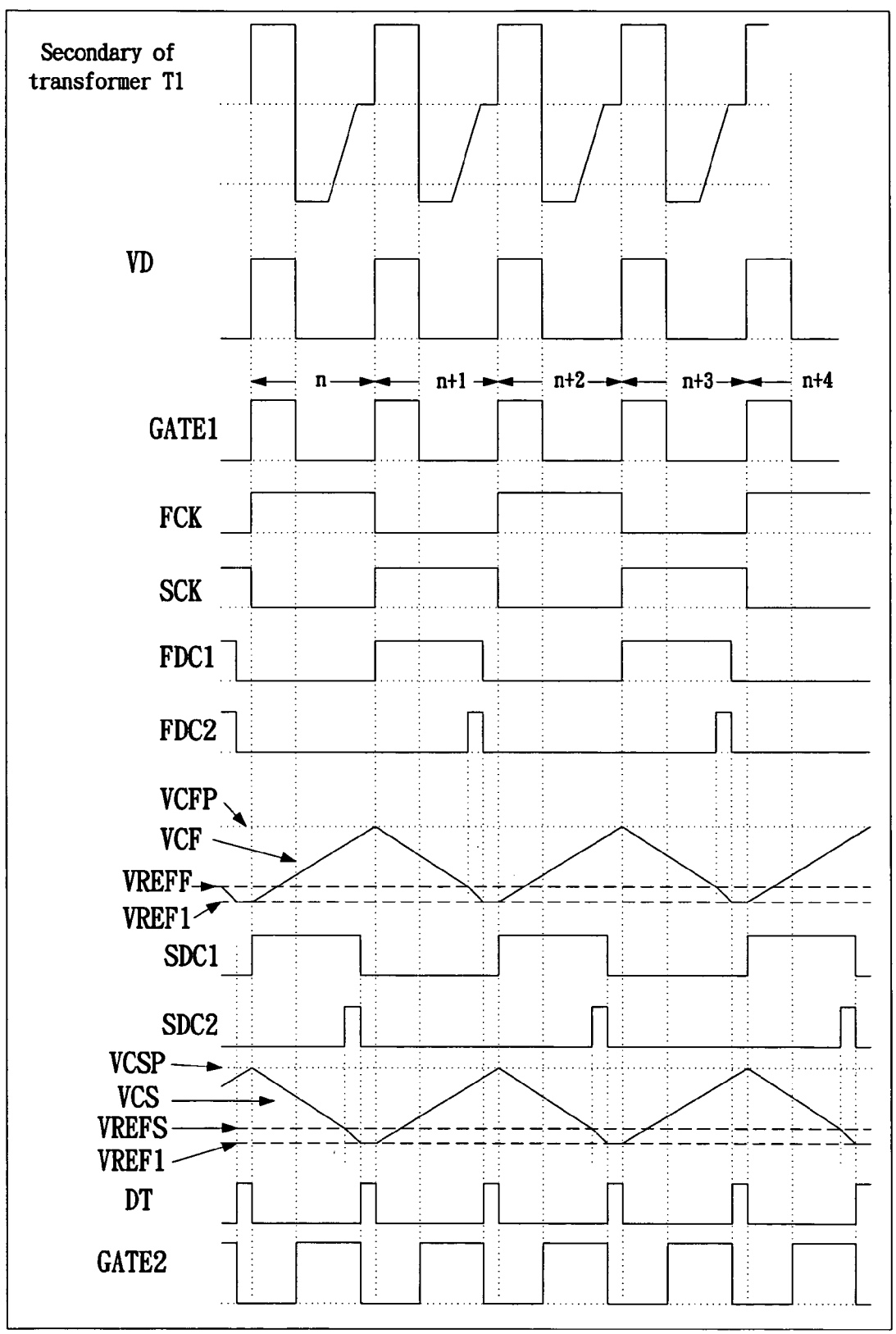
FIG. 3 shows a schematic view of an operating waveform diagram of synchronous rectifying control circuit in accordance with a preferred example of the present invention

FIG. 3 shows a synchronous rectifying control circuit in accordance with a preferred example of the present invention. The drain pin of the second current switch of the synchronous rectifying produces a synchronous control voltage signal VD and input the VD signal to the forward synchronous rectifying driven unit 2. When the third current switch Q3 of the primary is switched on, the second current switch Q2 of the secondary is switched off. When the DRAIN of the second current switch Q2 is reached to a high voltage, the synchronous control voltage signal VD produces a high voltage of input signal VIN through those voltage divider resistors R1 and R2. At the same time, the voltage of the input signal VIN is higher than the second reference voltage VREF2, the first comparator COMP1 outputs a low voltage signal altered into a high voltage signal to the first gate switch signal GATE1 of the first driver DRV1. The high voltage signal results the first current switch Q1 of the forward synchronous rectifier to be in a switched on status. When the current switch Q3 of the primary turns into a switched off status, the synchronous control voltage signal VD of the second current switch Q2 will alter into low voltage so that the first current switch Q1 of the synchronous rectifier will turn to an off condition. A fourth NOR gate NOR4 of the fly wheeling synchronous rectifying driven unit 6 inputs a first gate switch signal GATE1. When the first gate switch signal GATE1 changes into low voltage, the second gate switch signal GATE2 will alter immediately to high voltage. The second current switch Q2 of the fly wheeling synchronous rectifier will be in a switched on status.

The on-time period of the second current switch Q2 of the fly wheeling synchronous rectifier must be ended before the switching on of the first current switch Q1, otherwise, when both switches are switched on, the first current switch Q1 and the second current switch Q2 will have a serious cross-conduction problem. The cross-conduction problem will result a chip burn problem or drastically decreased the efficiency of the power circuit. The signal-producing unit acting as a frequency divider 3 inputs the first gate switch signal GATE1 through the flip-flop F0 and the first inverter INV1 to produce frequency values that are half of the original frequencies of the first current charge switch signal FCK and the second current charge switch signal SCK. Those half frequency values are then inputted respectively into the first charge & discharge circuit 4 and the second charge & discharge circuit 5 as current charge signals. When the first charge switch signal FCK is in a high potential, the charged switch of the first charge & discharge circuit 4 is switched on so that the first capacitor CF can be charged. Once the first charge switch signal FCK turns into low potential, the charging process of the first capacitor CF will be stop. The first discharge switch signal FDC1 of the first charge & discharge circuit 4 will turn the switch on so that the first capacitor CF will proceed a discharging process until the voltage value of the first capacitor CF is lower than the first reference voltage VREF1.

Refer to FIGS. 2 and 3, at an end of discharged period of the first discharge switch signal FDC1 of the first charge & discharge circuit 4, an auxiliary discharge period is added from the first auxiliary discharge switch signal FDC2 of the first charge & discharge circuit 4. During the auxiliary discharge period, the auxiliary discharge current is utilized to increase the discharging process. A discharge period of the first auxiliary discharge switch signal FDC2 of the first charge & discharge circuit 4 starts from a moment when the discharge voltage value of the first capacitor CF is lower than the voltage value of the first auxiliary reference voltage VREFF. When the discharge voltage value of the first capacitor CF is reached to the reference voltage VREF1, simultaneously, the discharging period of the first auxiliary discharge switch signal FDC2 and first discharge switch signal FDC1 of the first charge & discharge circuit 4 will be ended. The auxiliary reference voltage VREFF is utilized from technology of sample and hold to determine the values of the reference voltage. The formula of the auxiliary reference voltage calculated from is VREFF=VREF1+0.25*(VCFP−VREF1), wherein the VCFP is the maximum voltage value of the first capacitor CF. When the second charge switch signal SCK is reached to the high potential, the charge switch of the second charge & discharge circuit 5 is controlled to be in a switched on condition in a next period. So that, during a charging process of the second capacitor CS, the second charge switch signal SCK turns to low potential, the charging process to the second capacitor CS will be stop. Consequently, the second discharge switch signal SDC1 of the second charge & discharge circuit 5 will be controlled to keep the switch in an on status so that the second capacitor SC can be discharged. Once the voltage value of the second capacitor CS is lower than the voltage value of the reference voltage VREF1, the discharging process is thus stop.

Refer to FIGS. 2 and 3, at the end of a discharging period of the second discharge switch signal SDC1 of the second charge & discharge circuit 5, a discharging period of the second auxiliary discharge switch signal SDC2 is added. The discharging period of the second discharge switch signal SDC2 of the second charge & discharge circuit 5 starts when the discharge value of the second capacitor CS is lower than the voltage value of the reference voltage VREFS. When the second auxiliary discharge switch signal SDC1 of the first charged & discharged circuit 5 is reached to the value of the reference voltage VREF1, the discharging period will be ended. The auxiliary reference voltage VREFS is also utilized from the technology of sample and hold to determine the values of the reference voltage. The formula of the auxiliary reference voltage calculated from is VREFS=VREF1+0.25*(VCSP−VREF1), wherein the VCSP is the maximum voltage value of the second capacitor CS. When the first discharge switch signal FDC1 of the first charge & discharge circuit 4 and the second discharge switch signal SDC1 of the second charge & discharge circuit 5 both are inputted to the third NOR gate NOR3. The NOR gate NOR3 outputs a pause signal DT together with the first gate switch signal GATE1, in which both are inputted the fourth NOR gate NOR4 and the output of NOR4 passing through the third AND gate AND3 to provide the second gate switch signal. The second gate driver DRV2 produces a second gate switch signal GATE2 to enable the second current switch Q2 of the fly wheeling synchronous rectifier controlling the switching on/off during the relevant periods in order to prevent a cross-conduction problem from occurring.

FIG. 3 and refer to FIG. 2, the pause time of the pause signal DT starts at the moment when the voltage values of the first and second charge & discharge circuits 4 & 5 are lower than the reference voltage VREF1. The pause period stops when the synchronous control voltage signal VD turns to high potential, so that the width of the pause period can be adjusted or programmed by the control discharge current I2. When the value of the control discharge current I2 is bigger, the discharging periods of the first discharge switch signal FDC1 and the second discharge switch signal SDC1 of the first and second charge & discharge circuits 4 & 5 and the auxiliary discharge switch signals FDC2 & SDC2 become shorter. Thus, the pause time becomes longer, vice verse. When the value of the control discharge current I2 is smaller, the discharging periods of the first & second discharge switch signals FDC1 & SDC1 of the first and second charge & discharge circuits 4 & 5 and the auxiliary discharge switch signals FDC2 & SDC2 become longer, as a result, the pause time is then shorter.

The internal part of the pulse interruptive protection circuit 8 utilizes the oscillator OSC to produces clock signals CLK passing through the counter in order to determine the timing of every period of the first gate switch GATE1. When the value of the present period is 1.5 times larger than the value of the previous period, the second current switch Q2 of the fly wheeling synchronous rectifying will be forcibly to switch off on the following period, with the function of the anti reversing current protection circuit 9, So that the power circuit can work excellent in very light load condition. Therefore, the current switches Q1 and Q2 will not have the problem of the cross-conduction and current reversing.

Figure 4:
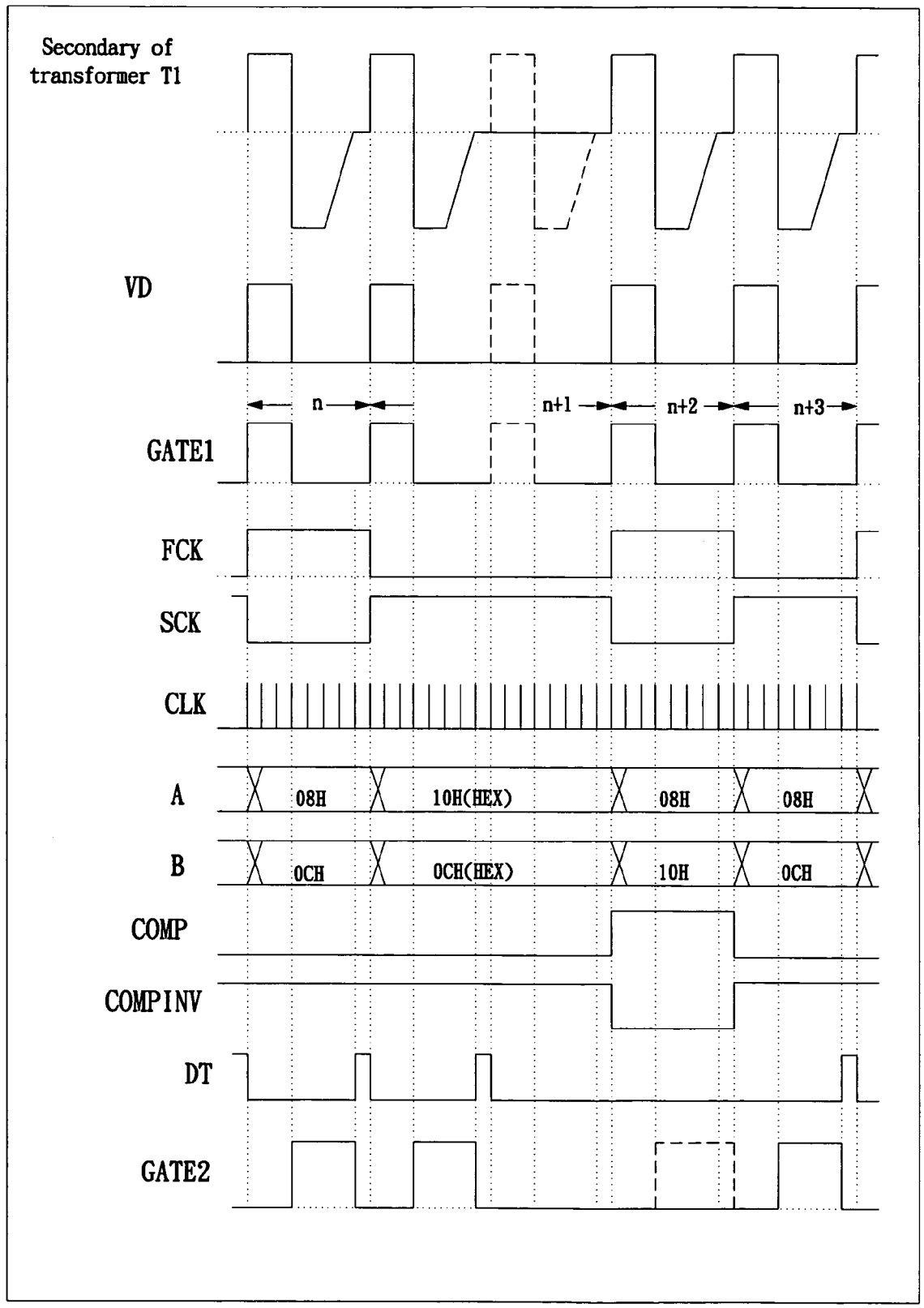
FIG. 4 shows another schematic view of an operating waveform diagram of a pulse interruptive protection circuit 8 of the synchronous rectifying control circuit in accordance with a preferred example of the present invention

FIG. 4 shows a schematic view of waveform diagram of a pulse interruptive protection circuit 8. Refer to FIG. 2, the synchronous control voltage signal VD has one pulse less, as a result, the first gate switch signal GATE1 has one pulse less in the whole switching period. If there is no the design of the pulse interruptive protection circuit 8, there will be no a pause time DT in the n+2 period. The dotted line in the diagram represents the second gate switch signal GATE2, in other words, when the first current switches Q1 & Q2 both being on status on the end of the second gate switch signal GATE2, a cross-conduction problem would occur. In order to prevent this problem from occurring, the design of the pulse interrupted protected circuit 8 is specific for this purpose by utilizing the counter to determine/count the actual value of the first count data A of the first gate switch signal GATE1 in one period. This actual value is processed through the periodic data processor DP and is multiplied to 1.5 of a preferred multiple in order to produce the second count data B. The digital comparator DC is utilized to compare the values between the first count data A and the second count data B in the same period. When the value of the first count data A is greater than the value of the second count data B, the conceal signal COMP is produced in the next period passing through the second inverter INV2 of the fly wheeling synchronous rectifying driver 6 to produce an inversing conceal signal COMPINV. The inversing conceal signal COMPINV is outputted to the third AND gate AND3.

FIG. 4, during the n+1 period, when there is one or more than one pulse of the first gate switch signal GATE1 fail to appear on the diagram, the value obtained for the second count data B in the n+2 period will be altered by multiplying a number which is greater than A. When the value of the first count data A is greater than the value of the second count data B during the n+1 period, the conceal signal COMP will be produced to switch forcibly the second current switch Q2 of the fly wheeling synchronous rectifying. A temporary output passage, that will be utilized as a current switch, will be a body diode of the MOSFET Q2. When the value of the second count data B in the n+2 period will be calculated by multiplying a number which has a value greater than one. The value of the first count data A will be smaller than the value of the second count data B when a normal condition returns in the n+2 period. As a result, in a n+3 period, the second gate switch signal GATE2 will then be returned to normal switching on period.

In FIG. 2, the anti reserving protection circuit 9 is designed to have a zero voltage detector, a sixth comparator COMP6 comprises two input terminals, one is a potential of drain gate of the second current switch Q2 of the fly wheeling synchronous rectifying and another is a ground potential. Further, the sixth comparator COMP6 is grounded through a SOURCE pin of the fly wheeling synchronous rectifying of MOSFET, so that the opposite voltage VDS between the SOURCE and DRAIN pins of the fly wheeling synchronous rectifying of MOSEFT can be directly detected. The second current switch Q2, in a continuous mode, the current released by the energy storage inductor L1 that has a value larger than zero. When energy storage inductor L1 releases energy, the value of the opposite voltage of the SOURCE and DRAIN pins will present in a negative potential condition. But in the discontinuous condition, the value of the negative potential can appear. The value of the opposite voltage of the source and drain gates move from negative to positive, a resonance voltage is thus produced. When the sixth comparator COMP6 detects that the value of the opposite voltage of the source and drain pins is greater than zero, the sixth comparator COMP6 output a signal immediately passing through the third AND gate AND3 of the fly wheeling synchronous rectifying driven unit 6 to enforce the second current switch Q2 of the fly wheeling synchronous rectifying to switch off. The energy discharged from an output filter capacitor C4 is prevented to flow/pass through the second current switch Q2 so that, a reverse current flowing to the ground will not be prevented.

Other embodiments of the invention will appear to those skilled in the art from consideration of the specification and practice of the invention disclosed herein. It is intended that the specification and examples to be considered as exemplary only, with as true scope and spirit of the invention being indicated by the following claims.

What is claimed is:

1. A synchronous rectifying control circuit, suitable for utilizing in a forward topology of rectifying circuit and controlling a first current switch and a second current switch provided on both ends of an output winding of a transformer, comprising:
   a forward synchronous rectifying driven unit, receiving a synchronous control voltage signal from the drain pin of the second current switch, and producing a first gate switch signal to control on and off of the first current switch;
   a signal-producing unit acting as a frequency divider, dividing an original frequency of the first gate switch signal into a half frequency, and producing a first charge switch signal and an inversed signal as a second charge signal of the half frequency;
   a first charge and discharge control circuit and a second charge and discharge control circuit, producing a charge current of the first charge switch signal and the second charge switch signal respectively during a charge period in order to provide charging respectively to a first capacitor and a second capacitor steadily, the first charge and discharge control circuit and a second charge and discharge control circuit are also producing a discharge current for discharging the first capacitor and the second capacitor steadily during a discharge period, potential of the first capacitor and the second capacitor are compared respectively with a first reference potential in order to produce respectively a first and a second discharge switch signals;
   a fly wheeling synchronous rectifying driven unit, inputting the first discharge switch signal and the second discharge signal in order to produce a pause period signal, wherein the pause period starts when potential discharge of the first and second capacitor are equaled to the first reference potential during a discharging period, and the pause period ends when a next charge period of the first and second charge switch signals starts, the fly wheeling synchronous rectifying driven unit inputs the first gate switch signal and the pause period signal so that a second gate switch signal of the fly wheeling synchronous rectifying is produced, the second gate switch signal is utilized to control the second current switch so that the second current switch will only be switched on during a non-pause period and when the first current switch is on an off status; and
   a power supply unit, providing source voltage, and outputting the first reference potential and a second reference potential.

2. The circuit of claim 1, wherein the forward synchronous rectifying driven unit utilizes a voltage divider resistor to obtain an input signal of the synchronous control voltage signal, the input signal is compared with the second reference potential in order to output the first gate switch signal from a first gate driver.

3. The circuit of claim 1, wherein the signal-producing unit acting as a frequency divider inputs the first gate switch signal to a flip-flop, the flip-flop then outputs the first charge switch signal passing through an inverter device so that the second charge switch signal is then outputted from the inverter.

4. The circuit of claim 1, wherein the potential of the first capacitor and the second capacitor are compared respectively with the reference potential, compared results are then inputted with a falling-edge trigger signal of the second charge switch signal and the first charge switch signal respectively into a first flip-flop and a second flip-flop, output signals of the first flip-flop and the second flip-flop are then inputted with the first charge switch signal and the second charge switch signal into a first NOR gate and a second NOR gate, the first and the second gates output respectively the first discharge switch signal and the second discharge switch signal.

5. The circuit of claim 1, wherein the discharge current of the first and the second charge and discharge control circuits further comprises at least one auxiliary discharge current.

6. The circuit of claim 5, wherein the potential of the first and the second capacitors are compared respectively to a first and second auxiliary reference potential, a compared result is inputted with the first and the second discharge signals into a first AND gate and a second AND gate respectively, a first auxiliary discharge switch signal and a second auxiliary discharge switch signal are calculated and outputted to control on and off statuses of at least one auxiliary discharge current.

7. The circuit of claim 1, wherein the first and second discharge switch signals are inputted into a third NOR gate, an output signal of the third NOR gate and the first gate switch signal are inputted into a forth NOR gate, the second gate switch signal is then outputted from a second driver.

8. The circuit of claim 7, wherein a third AND gate is installed in between the fourth NOR gate and the second driver to manage all controlling signals of the second current switch in order to produce the second gate switch signal.

9. The circuit of claim 1, wherein the circuit further comprises a pulse interruptive protection circuit to count pulses of a clock signal in order to obtain the time of every period of the first gate switch signal, a conceal signal is outputted to forcibly switch the second current switch off in a following period of a pulse interruptive period.

10. The circuit of claim 9, wherein the pulse interruptive protection circuit further comprises an oscillator providing the clock signals, the clock signals and the first gate switch signal are utilized by a counter to produce a first count data during every period, the first count data is proceeded through a data processor to produce a second count data, wherein when a value of the first count data of a present period is larger than a value of the first count data of a previous period, a value of the second count data in a next period will be equaled to the value of the first count data, otherwise, the value of the second count data is multiplied by a number which is greater than 1, further, a digital comparator is utilized to compare the values between the first count data and the second count data, in the present period, when the value of the first count data is larger than the value of the second count data, the conceal signal will be produced to switch forcibly the second current switch off in the next period.

11. The circuit of claim 1, wherein the circuit further comprises an anti reversing protection circuit, wherein potential of the synchronous control voltage signal and zero voltage of a ground are compared to output a anti reversing protective signal so that when the value of the synchronous control voltage signal is higher than zero voltage, the second current switch will be forcibly switched off.

12. The circuit of claim 1, wherein the power supply further comprises a band gap and an under voltage lock out protection circuit, the under voltage lock out protection circuit outputs the voltage power and an enabling signal controlling the second current switch, the band gap outputs the first reference voltage and the second reference voltage.

13. The circuit of claim 1, the charge current and the discharge current are fixed internally or determined respectively in accordance with an outer resistance.

14. The circuit of claim 1, wherein at least one auxiliary discharge current is fixed internally or determined respectively in accordance with an outer resistance.

* * * * *